Figure 1:
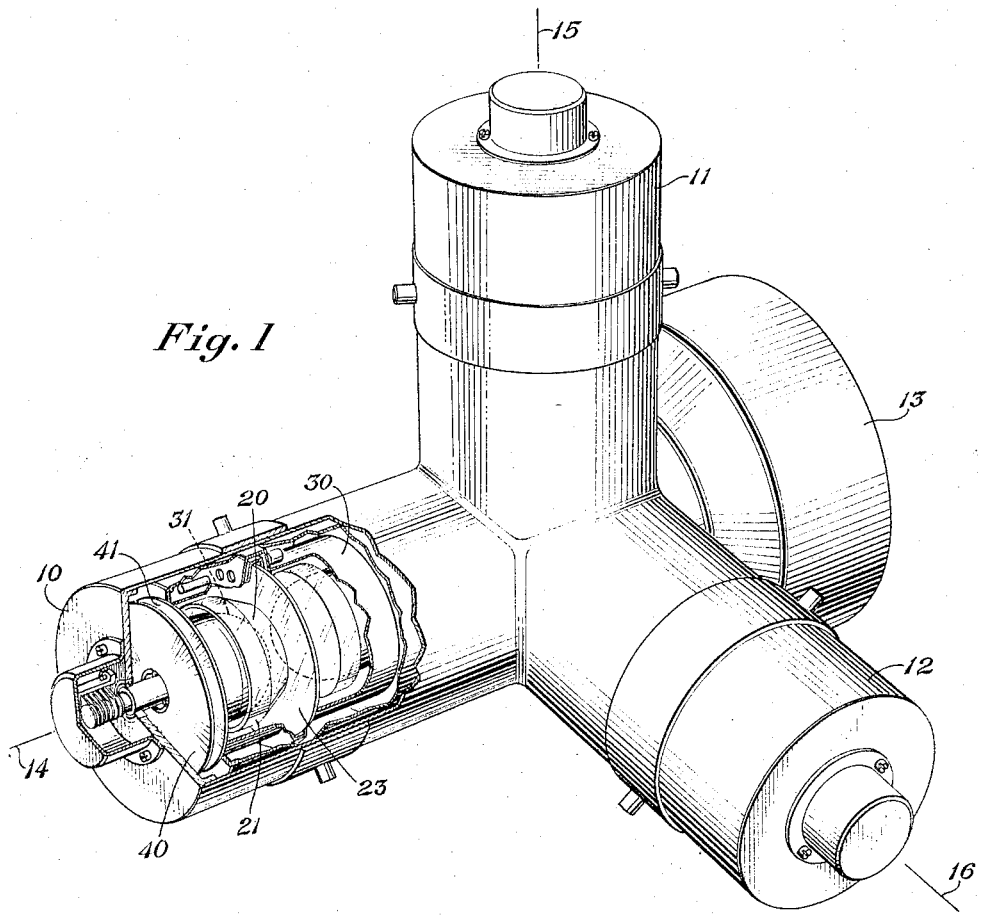

Dec. 27, 1966  D. L. ENSLEY  3,293,919

ULTRASONIC ANGULAR DISPLACEMENT SYSTEM

Filed July 29, 1963  5 Sheets-Sheet 1

Dec. 27, 1966   D. L. ENSLEY   3,293,919
ULTRASONIC ANGULAR DISPLACEMENT SYSTEM
Filed July 29, 1963   5 Sheets-Sheet 5

United States Patent Office 3,293,919
Patented Dec. 27, 1966

3,293,919
ULTRASONIC ANGULAR DISPLACEMENT
SYSTEM
Donald Luther Ensley, Hurst, Tex., assignor, by direct and mesne assignments, to Harvest Queen Mill & Elevator Company, Dallas, Tex., a corporation of Texas
Filed July 29, 1963, Ser. No. 298,261
18 Claims. (Cl. 73—505)

This application is a continuation-in-part of application Serial No. 113,546, filed May 29, 1961, now Patent No. 3,164,022, which in turn was a continuation-in-part of application Serial No. 778,673, filed December 8, 1958, now abandoned.

This invention relates to the detection of rotational displacement. In a further aspect, it relates to a non-gyroscopic inertial navigational control system and method. In a more specific aspect, it relates to a field support system for an inertial element in which mechanical radiation pressure gradients which are three-dimensionally inherently stable are employed for the support of an inertial reference element.

In guidance and sensing systems in which gyroscope wheels are employed, it is characteristic that the inertia of the body is enhanced by rotation. The objective of raising the inertia of the body is to decrease the effect of torques on the body. However, in such systems, more dynamic errors are introduced by endeavoring to generate angular momentum than by not doing so. The drift and errors introduced into gyroscopic-type systems require extensive measures for accommodating the system to its inherent environment and for providing correction functions.

The present invention provides a spin-free reference element in an ultra low torque suspension system. In application Serial No. 113,546, there is disclosed the support of a reference element in a flotation chamber by an ultrasonic field. The present invention is directed to an improvement over the system disclosed in said prior application, and has specific reference to an embodiment in which an inertial element is supported in a flotation chamber in a stable manner which is more readily achieved than in the form disclosed in said prior application.

The present invention is further directed to a system and method for balancing a reference element wherein the center of mass is shifted to coincide with the center of buoyancy whereby gravitational torques on the reference element are reduced to a negligible level.

More particularly, in accordance with the present invention, there is provided an inertial reference unit for sensing rotational displacement which includes a chamber having an acoustic transmission medium confined therein having a density dependent upon the pressure therein. A reference element is immersed in the medium having hollow end portions. Acoustic transducers mounted adjacent each of the end portions are provided for establishing an ultrasonic field in said medium, which, by reaction with the hollow ends, is characterized by standing pressure waves in which the element seeks an equilibrium position. Means are then provided for sensing relative rotational displacement of the housing relative to the reference element.

In accordance with a further aspect of the invention, a high gain rotational detector means is provided in which a chamber, normally slaved to an inertial element supported in an ultrasonic field in a neutrally buoyant state, may selectively be clamped to an outer case to prevent rotation of the chamber relative to the case.

In accordance with a further aspect of the invention, a method and system are provided for balancing a reference element by bipolar electroplating.

In accordance with a further aspect of the invention, a system start-up arrangement is provided wherein a reference element chamber is initially clamped to a supporting case and at least a portion of a sensing system is movable into predetermined positional relation with reference to the chamber, following which the chamber is unclamped from the case and slaved to the reference element.

In accordance with a further aspect of the invention, an inertial element is supported in an ultrasonic field and is freely rotatable on one axis within a chamber. The chamber is connected directly to a moving body. Computer means are provided for supplying a function representation of the transfer of rotation about said axis of the chamber through the fluid within the chamber to the inertial element.

Figure 2:
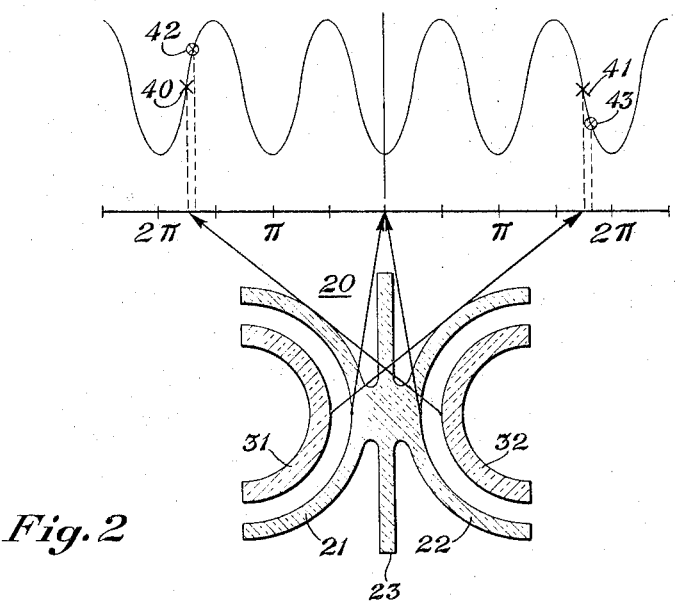
Figure 3:
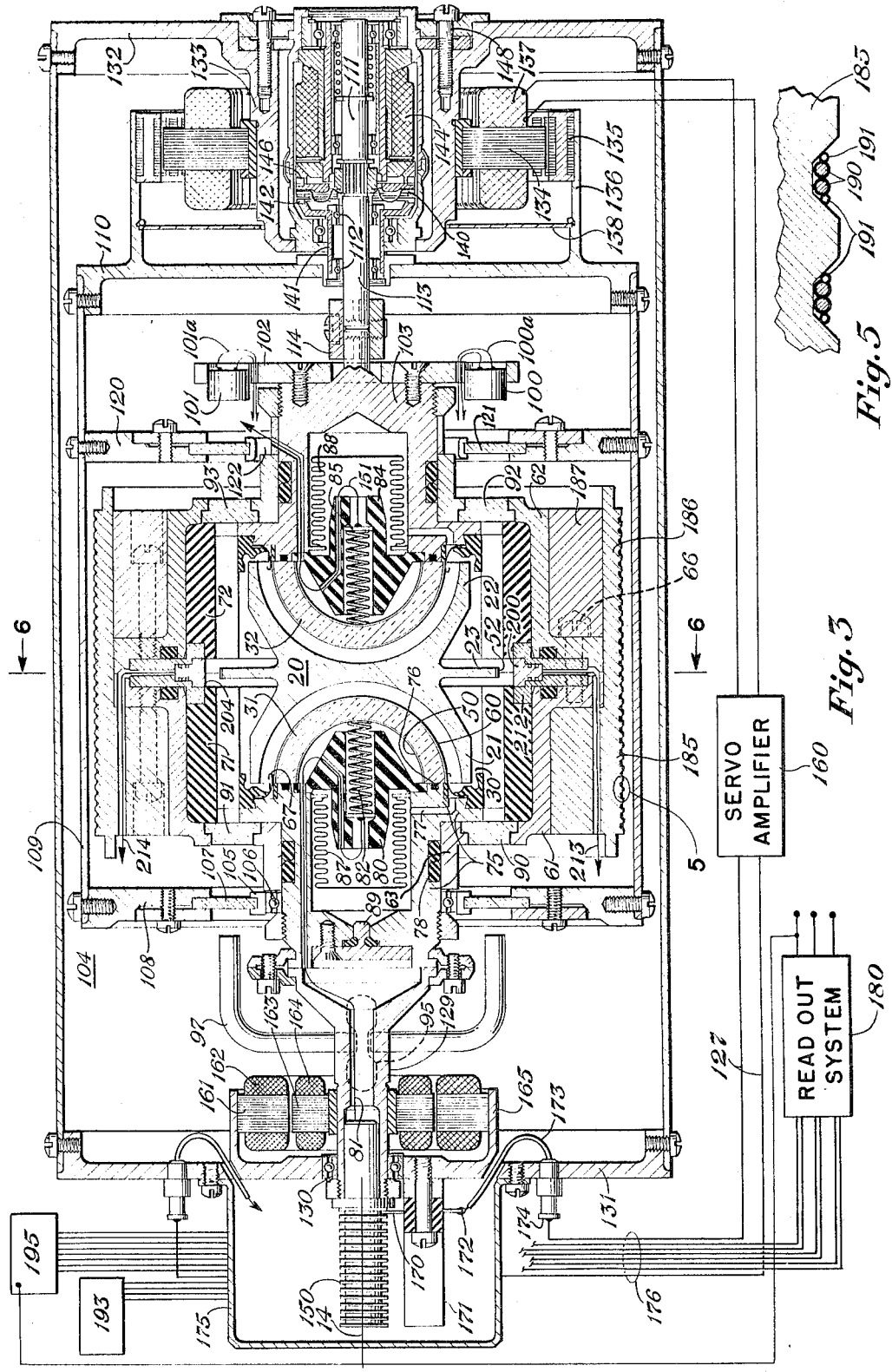
Figure 4:
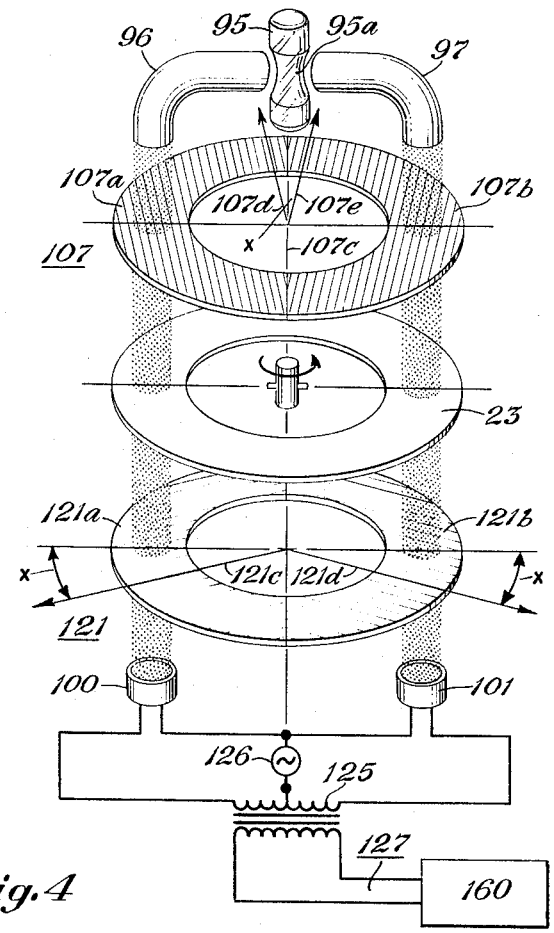
Figure 6:
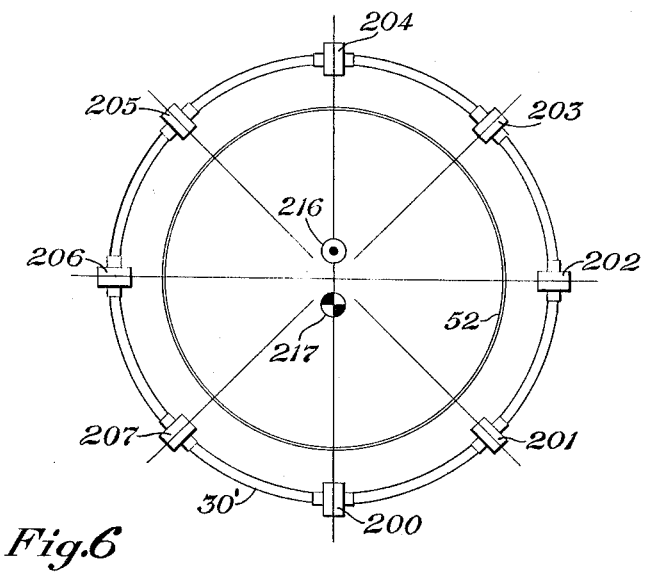
Figure 7:
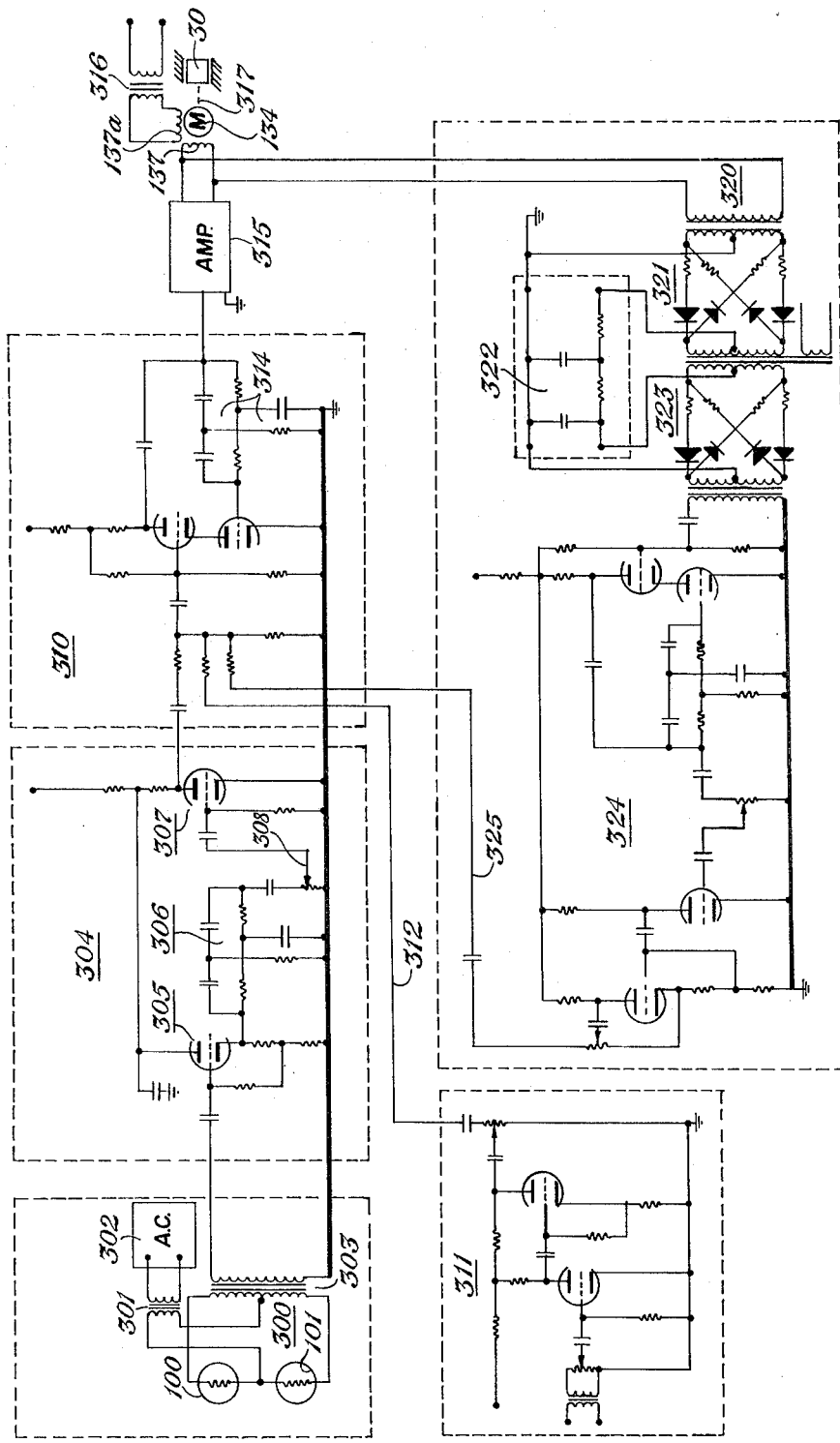
Figure 8:
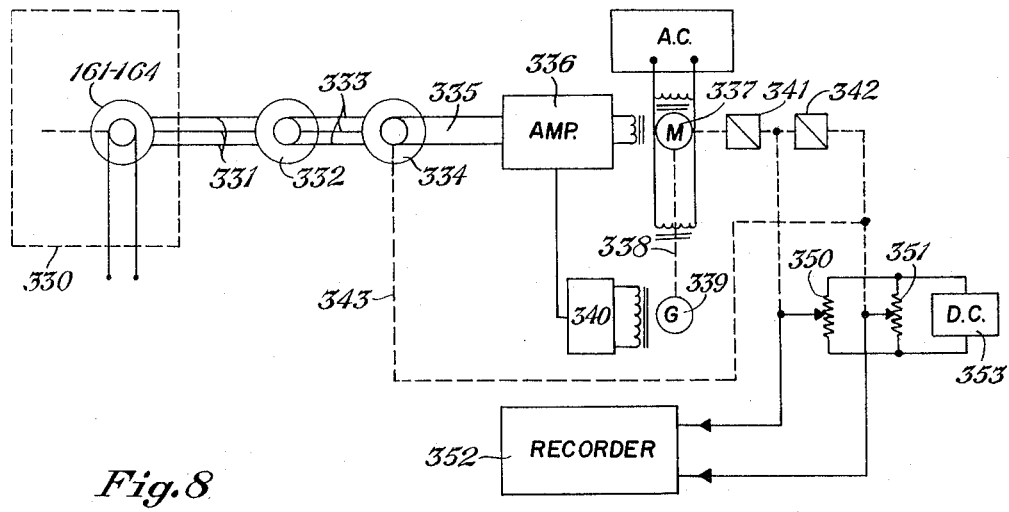
Figure 9:
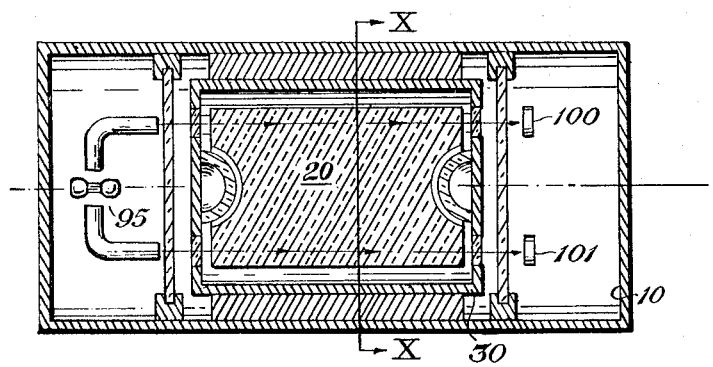
Figure 10:
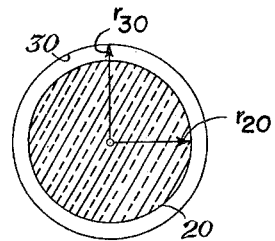
Figure 11:
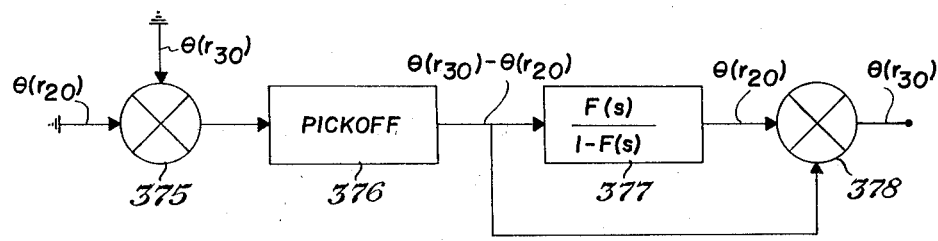

For a more complete understanding of the present invention and for further objects and advantages thereof, reference may now be had to the following description taken in conjunction with the accompanying drawings in which:

FIGURE 1 is a perspective view of a three-coordinate sensor system;
FIGURE 2 is a diagrammatic representation of the support for an inertial element;
FIGURE 3 is a sectional view of one embodiment of the invention;
FIGURE 4 is a schematic representation of the optical system of FIGURE 3;
FIGURE 5 is an enlarged view of an edge of cylinder 185 of FIGURE 4;
FIGURE 6 is a diagrammatic cross section to illustrate placement of microbalancing electrodes;
FIGURE 7 is a schematic circuit diagram of a gimbal control servo amplifier;
FIGURE 8 is a schematic circuit diagram of a readout servo unit;
FIGURE 9 is a longitudinal cross-sectional view of a strapped down system;
FIGURE 10 is a sectional view taken along line 10—10 of FIGURE 9, and
FIGURE 11 is a block diagram of a sensor system including the unit of FIGURES 9 and 10.

Referring to FIGURE 1, there is illustrated a three-coordinate sensing system in which three cylindrical cases 10, 11 and 12 are mounted on a base 13. The axes 14, 15 and 16 are mutually perpendicular. The base 13 is provided for mounting the sensing system on a moving body, the orientation of which is to be determined and/or controlled in three dimensions.

The system includes three ultrasonic field-supported inertial elements enclosed in servo driven gimbal platforms. Each platform is bearing-supported in its outer case. An electronic system is employed, which includes means for field excitation, a lamp excitation means, gimbal control and servo and heater control.

Each platform includes nine major functional components:
(1) A support field and flotation chamber;
(2) A lamp and an optical mounting;
(3) A Polaroid carriage;
(4) A clutch brake;
(5) A photo conductor mounting;
(6) A torquer motor;
(7) A synchro transmitter;
(8) A slip ring assembly, and
(9) An outer case.

More particularly, in each of the cases 10–12, a separate inertial element is suspended to provide a reference for rotation of each case about its axis. More particularly, a quartz inertial element 20 is suspended in a chamber 30. The inertial element 20 includes a thin central disk 23 with cylindrical ends 21 and 22 whose axes correspond with the axis of the disk 23. The end 21 faces the left end of the chamber 30. End 22 faces the right end of the chamber 30. The ends 21 and 22 each have a conical portion where they join with the central disk 23. Ends 21 and 22 are hollowed in spherical form. The hollows in ends 21 and 22 encompass hemispherical electrostrictive ultrasonic transducers 31 and 32, respectively. Transducers 31 and 32 are electrostrictive shells. They are excited by alternating current for the generation of ultrasonic fields within the chamber 30.

The space in chamber 30 not occupied by element 20 is filled with an acoustically transmissive flotation liquid which is slightly compressible and which has a density corresponding with the density of the element 20. The ultrasonic fields generated by transducers 31 and 32 are radially divergent. The fields react with element 20 such that standing waves are produced in the liquid. The resultant forces on element 20 are such that the element 20 will be resiliently restrained at a reference position. In such position, it remains fixed in inertial space so far as rotation about axis 14 is concerned.

The chamber 30 is included in a servo-loop so that it tracks the element 20 when the base 13 rotates about axis 14. A readout means is then provided such as represented by the disks 40 and 41 to provide a signal representative of the rotation of the base 13 and about axis 14.

Identical means are provided in each of housings 11 and 12 so that the character of the total motion of the base 13 is fully defined by three signals thus generated.

As will be described in detail, chamber 30 is a stainless steel, Teflon-lined closed cylinder. The Teflon liner has openings for the free passage of the pick-off light beams. Strain-free optical windows, expansion bellows, and filler plugs are mounted on the ends of the chamber 30. Heater and heat sensor windings are wound and potted on the external periphery of the chamber 30 for temperature control. The inertial element 20 is floated in low viscosity fluid and is supported on an ultrasonic field produced by the transducers 31 and 32. No mechanical connection is made between the chamber 30 and the inertial element 20 except the direct contact with the flotation fluid. In operation, heater windings maintain the entire chamber at constant temperature and the expansion bellows permit freedom of fluid expansion.

With the inertial element 20 in place in the chamber 30, the chamber is filled with flotation fluid and a filler plug is sealed. The resulting enclosed cylinder comprises the flotation chamber.

The operation of the system is based primarily upon the flotation of the inertial element 20 in the chamber 30 and the generation of a time average radiation pressure. It may readily be shown that the first order propagation equation for excitation of the transducers 31 and 32 is as follows:

$$C^2(\nabla^2 \phi) - \frac{\partial^2 \phi}{\partial t^2} = 0 \quad \text{(linear response)} \quad (1)$$

where:

C is the phase velocity of the sound generated by the transducers 31 and 32;
$\phi$ is the velocity potential of the sound field;
$\partial^2/\partial t^2$ is the second derivative with respect to time, and
$\nabla$ is a differential operator.

The second order propagation may be shown to correspond with the following expression:

$$C^2(\nabla^2 \phi) - \frac{\partial^2 \phi}{\partial t^2} + \frac{\partial}{\partial t}(\nabla \phi)^2 - (n-1)\frac{\partial \phi}{\partial t}\nabla^2 \phi = 0 \quad (2)$$

where:

n is the power in the polytropic relationship between pressure and density $$\frac{P}{P_0} = \left(\frac{\rho}{\rho_0}\right)^n$$

with $P_0$ and $\rho_0$ being undisturbed pressure and density and P and $\rho$ being reference pressure and density.

From Equation 2, it can be shown that the time average radiation pressure ($P_a$) is expressed by the following relationship:

$$P_a = \frac{\rho_0}{2}\left[\frac{1}{C^2}\overline{\left(\frac{\partial \phi}{\partial t}\right)^2} - \overline{(\nabla \phi)^2}\right] \quad (3)$$

where:

$\rho_0$ is the density of the undisturbed fluid in which the sound field is generated.

The system is so constructed that the boundary conditions which are present maximize the time average pressure (Equation 3). As a result, a stable resilient suspension is provided which is characterized by the absence of coulomb friction.

FIGURE 2 is explanatory of the suspension. In FIGURE 2 the element 20 has been shown in its normal relationship with respect to the transducers 31 and 32. FIGURE 2 also includes, on an expanded scale, a representation of pressure standing waves in the fluid. The zero reference ordinate corresponds with the surfaces of the transducers 31 and 32. Distance to the right represents separation from the face of cylinder 21. Distance to the left represents separation from the face of cylinder 22. When the element 20 is positioned symmetrically in the pressure field, the inner faces of the element 20 are at the positions of equal pressure as represented by points 40 and 41. However, if the element 20 moves to the left relative to transducers 31 and 32, the surface of end 21 is closer to the surface of transducer 31 and thus is at a higher pressure potential as represented by point 42. At the same time, the surface of the end 22 is at a lower pressure potential as represented by point 43. As a result, the element 20 is moved back to its equilibrium position where the pressure at the surfaces of ends 21 and 22 are equal. Since the forces are in opposition, the element 20 is maintained at a reference position.

Since the transducers 31 and 32 are hemispheres and since the hollows of the ends 21 and 22 are symmetrical with respect to the axis of element 20, the element 20 is restrained by the same reaction in the two other coordinates corresponding with axes 15 and 16. Thus, the element 20 is resiliently supported by the second order time average radiation pressure existing in the fluid in chamber 30.

It will be noted that the element 20 is not restrained as to rotational forces. Consider rotation of the base 13 about axis 14. When the chamber 30 rotates with the base 13, the inertial element 20, except for the fluid coupling, will remain in fixed position.

Rather than permit any appreciable rotation between the element 20 and the chamber 30, a servo-loop is employed which includes a suitable drive mechanism for forcing the chamber 30 to follow the element 20 even though the base 13 may rotate about axis 14. In order to assist in this matter, an optical system is employed, as will hereinafter be described, for sensing minute relative rotation between the element 20 and the chamber 30. The error signal thus developed is employed for driving the chamber 30 to follow the inertial element 20. Since the chamber 30 will be rotated relative to the case 10, the readout system as represented by disks 41 and 42 may be employed to provide signals which show the degree of rotation of the base 13 about axis 14.

Referring now to FIGURE 3, one embodiment of the system, including inertial element 20 and chamber 30, is shown in a detailed cross-sectional view. The inertial element 20, in accordance with a preferred embodiment of the invention, is accurately formed from quartz and is optically finished. The element 20 is from a single crystal of natural quartz preferably free from both mechanical and electrical twinning. The transducer 31 is shown in section and is in the form of a hemispherical shell and preferably is of a lead zirconium titanate alloy. Silver films 50 and 60 are plated onto the inner and outer surfaces, respectively, of the transducer 31. In a similar manner, the surfaces of the transducer 32 are plated. Thus, electrical contact can be established both to the inner and to the outer surfaces of both transducers 31 and 32. The transducers are to be excited in-phase at ultrasonic frequencies so that the sound fields directed along axis 14 instantaneously are equal in magnitude and opposite to each other.

The rim of the central disk 23 is plated with a silver band 52 for balancing purposes as will hereinafter be described.

The chamber 30 includes an inner case formed by cups 61 and 62. The confronting flanges on the rims of cups 61 and 62 are secured together as by screws 66.

The wall of the case 61, 62 is lined with a suitable sound-absorbing insulating lining such as Teflon. In the form illustrated, the lining is in two parts, 71 and 72, one in each cup. The transducer 31 is mounted on the rim of a cup-like metallic insert 75 by a band of a suitable epoxy cement, the cement being shown in the zone 76. The insert 75 is secured in the bottom of cup 61. The bottom of cup 61 has an axial opening which is concentric with the central opening in the insert 75. The metallic insert 75 has a re-entrant opening, providing a shoulder on which an insulating insert 80 of material such as Teflon is secured. The insert 80 has a central well therein with a spring contact 82 being positioned in the well which extends into contact with the metallic film 50 on the inside of transducer 31. The insert 80 is mounted into the insert 75 with a pressure-tight fit. Metallic insert 75 is sealed to the end plate 63 by an O-ring 78.

The spring 82 is to be connected to the high potential terminal of an A.C. driving voltage source as by conductor 81 and thus serves to apply a potential through spring 82 to the transducer 31. Springs 67 disposed along the outer wall of the transducer 31 complete an electrical path from the outer surface of the transducer 31 to the case 61, 62.

A similar arrangement is provided for mounting the transducer 32. A central pin 85, mounted in a Teflon insert 84, supports a spring contact for the inner surface of the transducer 32.

The chamber 30 is filled with a transparent liquid of density preferably corresponding with the density of the element 20. Since the liquid may be subject to change in volume with temperature, provision is made for accommodating expansion without substantial change of the static pressure within the housing. For this purpose, bellows 87 and 88 are mounted at both ends respectively of inserts 75 and 103. Channels, such as channel 77, lead from the interior of case 61, 62 to the zone between the outside of bellows 87 and the inside of the insert 75. A fill plug 89 is provided for permitting the introduction of flotation liquid into the chamber 30.

A pair of diametrically opposed light beams are directed through the chamber 30 to sense any rotation about axis 14. More particularly, two apertures in the cup 61 are closed by clear strain-free glass disks 90 and 91. Two apertures in cup 62 are sealed by disks 92 and 93. Disks 90 and 92 are aligned with each other, as are disks 91 and 93. The central disk 23 of the inertial element 20 is of radius greater than ends 21 and 22 and thus light beams transmitted through disks 90 and 92 and 91 and 93 pass through disk 23.

Light beams from a bulb 95 (shown dotted) are fed through light pipes 96 and 97 as to be directed along a line passing through the plates 90 and 92, and along a line passing through plates 91 and 93, respectively. Light passing through the chamber 30 is detected by two photocells 100 and 101. Cells 100 and 101 are mounted on a bracket 102 which is secured to the insert 103 in the cup 62. The cells 100 and 101 are mounted at diametrically opposed points as to intercept any light passing through the disk 23 and the plates 92 and 93, respectively.

A Polaroid carriage 104 is mounted so that it may be rotated independently of the chamber 30. The Polaroid carriage 104 includes an inner ring 105 mounted on a bearing 106. Bearing 106 is mounted on the outer surface of the insert 75. A two-piece Polaroid ring 107 is mounted on the ring 105. An outer clamping ring 108 is supported by the ring 107. The ring 108 is secured to a cylinder 109 which extends beyond the right-hand end of the chamber 30. The cylinder 109 is supported at the right-hand end by an end cap 110 which is supported for free rotation relative to a clutch unit 111 as by bearings 112. The bearings 112 are supported or journaled on a shaft 113 of the clutch unit 111. The shaft 113 is clamped by member 14 to the protrusion or stub shaft extending from the insert 103.

An intermediate clamp ring 120 is secured inside the cylinder 109 and supports a two-piece Polaroid ring 121. The inner diameter of ring 121 is rimmed by a stabilizing ring 122.

The optical system thus described is illustrated schematically in FIGURE 4 where the light source 95 is a gas-filled bulb that is excited by a radio frequency voltage. Light emanating from the constriction 95a in the bulb 95 is piped by fiber optical light pipes 96 and 97 for passage through the dual-plate Polaroid ring 107. The dual-plate Polaroid ring 107 includes a left-hand plate 107a and a right-hand plate 107b. The optical axes of plates 107a and 107b are each divergent at a slight angle $x$ from the center line 107c.

Beams of light passing from light pipes 96 and 97 pass through elements 107a and 107b and are thus polarized in the directions of arrows 107d and 107e. The beams of light then pass through the disk 23, which is a $\pi$-wave plate. The beams then pass through the two-element Polaroid ring 121. Elements 121a and 121b of ring 121 mate with each other in a plane which includes line 107c. However, the axes of the Polaroid elements 121a and 121b are at 90° with reference to the arrows 107d and 107e, respectively. The optical axis of element 121a corresponds with the arrow 121c. The optical axis of the element 121b corresponds with the arrow 121d. Photocells 100 and 101 are disposed in alignment with the beam from elements 96 and 97. Thus, if the $\pi$-wave plate 23 rotates relative to the chamber 30 and the Polaroid carriage 104, the output signals from cells 100 and 101 will pass cyclically through maxima and minima voltages.

The cells 100 and 101 are connected in series opposition with a transformer 125. They are also connected to a voltage source 126. The secondary winding of transformer 125 is connected by way of an output circuit 127 to input terminals of a gimbal control servo amplifier system.

By arranging the axes of the Polaroid segments 107a and 107b at a very small angle $x$ and employing an angle $x+90°$ for the separation between the axes of Polaroid elements 121a and 121b, the use thereof, together with a half-wave plate 23, provides extremely high optical amplification of any rotational displacement of the plate 23 with reference to the Polaroid carriage 104. The system is controlled such that the output signal appearing in the output channel 127 is normally a null signal. However, when the chamber 30 tends to rotate relative to the inertial element 20 and the disk 23, a signal appears in output channel 127 which in magnitude is proportional to the rotation and has a polarity representative of the direction or sense of the rotation. In a manner to be described, the output signal is then employed in a servo feedback system to force the chamber 30 to track the element 20.

The Polaroid carriage 104 is housed within the case 10. The hollow shaft 129 at the left end of the gimbal mounting is journaled in a bearing 130 in the left end plate 131 of the case 10. The chamber 30 and the Polaroid carriage 104 are supported at the right-hand end on the shaft 113 extending from the clutch brake 111. The clutch brake structure 111 is mounted in cylinder 133 in the end plate 132. Mounted on the outer surface of the cylinder 133 is a stator 134 of a torquer mechanism. The rotor element 135 of the torquer is secured on the inner wall of an extension 136 of the end plate 110, which forms a part of the Polaroid carriage 104. Armature windings 137 are formed on the stator 134 and comprise a plurality of spools disposed at each of a plurality of angularly-spaced locations around the ring-shaped stator 134. A thin mu-metal ring 138 is mounted in the Polaroid carriage 104 between the stator 134 and the end plate 110. The ring 138 serves as a magnetic shield for portions of the system to the left side of the end plate 110.

The clutch brake mechanism 111 includes a spring-supported clutch plate 140. The clutch plate 140 is keyed to the shaft 113. When the clutch is de-energized, plate 140 serves to lock the Polaroid carriage 104 to the shaft 113. It will be noted that the plate 110 of carriage 104 is secured to a clutch element 141. The clutch element 141 carries a clutch plate 142 which engages the clutch plate 140 when the clutch is de-energized.

When a clutch winding 144 is energized, the clutch plate 140 contacts a third clutch plate 146. The Polaroid carriage 104 is released from shaft 113 and simultaneously the shaft 113 is locked to the case 10. It will be noted that the winding 144, its housing and the various remaining elements of the clutch brake 111 are fixed to the case 10 as by screws 148.

When the winding 144 is de-energized, the Polaroid carriage 104 is locked to shaft 113. In this condition, energization of the torquer windings 137 will cause the Polaroid carriage 104 and the chamber 30 to rotate as a unit relative to the outer case 10. However, with the clutch winding 144 energized, the shaft 113 is locked to the outer case 10 and energization of the winding 137 on the torquer will rotate the Polaroid carriage 104 only. The clutch brake unit 111 is provided with the foregoing selectivity in order to facilitate start-up of the system without undesirable gyrations. That is, when the system is started up, the inertial element 20 will be at a random position with reference to the Polaroid carriage. For start-up, the chamber 30 is locked to the outer case 10 and the Polaroid carriage 104 is then rotated until the output signal is null, in which state the Polaroid carriage is positioned so that minimum light reaches the cells 100 and 101. When this condition is achieved, the winding 144 is deenergized to release the chamber 30 from case 10 and to tie the chamber 30 to the Polaroid carriage 104. In this condition, the chamber 30 will be forced to track element 20.

The electrical leads 100a and 101a from cells 100 and 101 are threaded along the chamber 30 and terminate at separate rings on a slip-ring unit 150. Power is fed to the transducers 31 and 32 as by way of conductor 81 and conductor 151, which conductors also terminate at the slip-ring 150. Power is likewise fed to the light source 95 through the slip-ring unit 150. The output circuit 127 from the photocells 100 and 101 is connected by way of a servo amplifier 160 to the stator winding 137 of the torquer. By this means, the chamber 30 is rotated relative to the outer case 10.

One form of readout system for producing a signal representative of the relative rotation between the chamber 30 and the outer case 10 includes an induction pick-off system in which a stator core 161 is provided with stator windings 162. A rotor core 163 having windings 164 is mounted on the hollow shaft 129 and rotates with the chamber 30. The stator 161, 162 is mounted in an inwardly-depending ring 165, forming a part of the end plate 131. The shaft 129 is hollow to permit passage therethrough of the conductors leading to the slip-ring unit 150. A plurality of brushes, such as the brush 170, are mounted on a brush holder 171 with conductors leading from each of the terminals on the brush holder 171 to insulated output terminals mounted in the end plate 131. For example, the brush 170 is connected to a brush post 172 and, thence, by way of conductor 173, to the output terminal 174. A plurality of terminals, such as terminal 174, are mounted in a circular array on plate 131, with one terminal being provided for every contact on the slip-ring 150. A cap 175 is provided to cover the slip-ring unit 150. The cap 175 is secured to the outer surface of the end plate 131. A cable 176, which includes the conductors forming channel 127, also includes conductors extending from the readout synchro 161 and 162. The latter conductors extend to the readout system 180.

As a part of chamber 30, an outer metallic shell or cylinder 185 encompasses the cup 61 and has an extension 186 which extends to the end of the cup 62. A short cylindrical insert ring 187 fills the void between the outer wall of cup 62 and the inner surface of the extension 186. A heater winding and a temperature sensing winding are placed on the threaded outer periphery of the cylinder 185. As best shown in FIGURE 5, two windings 190 of a header are positioned in each of the valleys of the threaded periphery of cylinder 185. Two windings 191 of a heat-sensing element partially overlie the windings 190 to provide for temperature sensing and control of the temperature of the chamber 30. The windings 190 and 191 extend through the slip-ring unit 150, to a suitable heater temperature control unit 193.

With the system thus far described, excitation of the transducers 31 and 32 will produce an ultrasonic field within the chamber 30 for support of the inertial reference element 20. The system is so designed and constructed that the net torque on the element 20 is small so that dynamic errors are substantially eliminated. There is thus achieved an ultra-low torque suspension system in a relatively simple way. The system is of greatly reduced complexity and has but a minimum of moving parts so that it presents advantages over prior art systems in the broad areas of mean time-to-failure, overall system reliability and reduction in overall cost. This is accomplished with the system of FIGURE 3 wherein no stabilizing circuits or servos are required at all for the field support system. Torque levels below $1 \times 10^{-7}$ dyne/cm. with spring constants of $1 \times 10^6$ dyne/cm. have been achieved.

The foregoing is achieved through the use of mechanical radiation pressure gradients which are three-dimensionally inherently stable. The particular system illustrated in FIGURE 3 wrapped around the reference body 20 is an angular displacement sensor wherein a 10 gm.-cm.$^2$ inertial element is supported in the ultrasonic field. The chamber 30 is tightly linked in a servo-loop so that viscous coupling is prevented from reaching the reference element 20.

It has been found that, in some cases, it is desirable further to refine the system. As previously explained, the reference element 20 is formed from a single crystal of natural quartz. The quartz employed preferably is free from both mechanical and electrical twinning and other mechanical flaws. However, it has been found that even with the greatest of precision in forming element 20, the center of mass may be found to be spaced from the center of buoyancy. It has been found desirable to reduce the separation between the center of mass and the center of buoyancy of the inertial element to reduce the torque on element 20.

In accordance with this aspect of the present invention, there is provided an electrolytic microbalancing method. Through such method it is possible to form the reference element less expensively by fabrication of separate geometrical segments and then cementing the segments together in a final form. Balancing of the composite element to a high degree of accuracy may be the final step. The degree of accuracy obtainable with any balancing method is limited by the amount of static friction or torque reaction in the supporting mechanism. The microbalancing method of the present invention is capable of very high accuracy because there is no static friction in the supporting mechanism. Rather, the supporting mechanism is an ultrasonic field in a flotation fluid.

The accuracy obtainable is also limited by the smallest possible correction which can be performed on the element. The electrolytic microbalance method of the present invention corrects for unbalance through the use of a bipolar plating action that can be controlled to submicroscopic magnitudes. Control of the electrolytic process to such degree of accuracy requires that no self-plating occurs. In order to carry out the plating process for such microbalancing results, there is provided a set of eight silver electrodes, including electrodes 200 and 204, FIGURE 3. The electrodes are spaced at different positions in a circular array facing the edge of the disk 23. It will be recalled that the disk 23 is provided with a metallic rim 52 of silver. Electrode 200 is mounted in an insulating insert 212, which in turn is supported between the abutting ends of the rims of cups 61 and 62. An electrical conductor 213 is connected to electrode 200 and (though not shown) extends to the slip-ring unit 150. Similarly, a conductor 214 provides an electrical circuit from electrode 204 to the slip-ring 150.

As illustrated in FIGURE 6, which is a diagrammatic sectional view taken along the line 6—6 of FIGURE 3, electrodes 200 and 204 are shown at diametrically opposed positions with reference to the disk 23. It will be noted that the metallic ring 52 extends around the periphery of the disk 23. Electrodes 200–207 are spaced uniformly around the wall 30' of the chamber. Assume that the center of buoyancy CB is at point 216 and that the center of mass CM is at point 217. In accordance with the microbalancing techniques of the present invention, current is caused to flow between selected pairs of the electrodes 200–207, to remove silver from one point on rim 52, while depositing silver from one electrode onto the rim 52 at another selected point. Such microbalancing is carried out with the element 20 in the flotation chamber 30. The electrolyte employed in the microbalancing technique may, if desired, be employed as the flotation fluid in the system as ultimately placed in use. Alternatively, it may be removed after the plating operation has been completed and with a different flotation fluid of like specific gravity then being added.

Bipolar plating is possible because of the presence of parallel paths of differing conductivities between two main electrodes in the electrolysis cell formed by the chamber 30. One path is the metallic silver rim 52 which is the bipolar electrode for the microbalancing method. The silver rim 52 is placed by vacuum deposition on the ground finished rim of the disk 23 and forms a path of low resistance.

In accordance with an equilibrium mode of microbalancing, the element 20 to be balanced is held free from any supporting members by the ultrasonic field. With the electrolyte transparent, the chamber 30 is slaved to the inertial reference eement 20 through the use of the servo ampifier system 160, thus forming a single axis servo gimbal platform. The system is arranged so that the longitudinal axes 14 of the element 20 and chamber 30 are horizontal. The electrodes 200–207 are selectively connected through a switch means to a current source. The balancing procedure starts from the equilibrium position wherein a line passing through the center of buoyancy 216 and center of mass 217 is vertical. A very low D.C. current is then caused to flow across the cell between two opposed electrodes which lie vertically one above the other. Mass transfer across the shoulders of the disk 23 results from bipolar plating action, and is in the reverse direction of the current flow. Since the mass transfer cannot be controlled to exact coincidence with the direction of the gravitational forces, the inertial element rotates in an effort to maintain the alignment of the center of buoyancy and the center of mass axis in the vertical position. The chamber 30 rotates with the element 20 because it is slaved through the servo system. When the reference element 20 has rotated to a new equilibrium position which is 45° from the original equilibrium position, the current flow is commutated back to the pair of opposed electrodes then lying in vertical orientation. This completes one cycle of operation and results in a decreased separation between the center of buoyancy and the center of mass. The foregoing cycle is then repeated until the center of buoyancy and center of mass separation is reduced to a sufficiently small value. The reduction in the separation is given by the expression:

$$E = E_0 (0.414)^N \qquad (4)$$

where:

E is the separation, and
$E_0$ is the initial separation.

The reduction of separation is approximately 1/40,000 when N equals 12.

In accordance with a second mode of the microbalancing, substantially the same steps are carried out except for the commutation of the current. In accordance with a non-equilibrium mode, the current flow through the balancing electrodes is commutated ahead so that the reference element 20 never reaches a new equilibrium position.

Each commutation preferably is accompanied by a reduction in current. The speed of rotation then diminishes as the separation between the center of buoyancy and center of mass becomes less. Finally, as the center of mass and center of buoyancy near coincidence, the platform comes to rest. At this point, the bipolar plating process is halted. The end of the balancing operation is indicated when the signals delivered to the readout system 180 cease to exhibit change.

The microbalancing method of the present invention will be suitable for bringing into coincidence the center of mass and center of buoyancy of a given element that may be placed in a neutrally buoyant flotation condition. A fraction of the mass of the initial metallic coating is transferred across the element by the bipolar plating action. Either the equilibrium logic or the non-equilibrium logic may be employed for shifting the center of mass to the center of buoyancy. This provides an effective means for providing an inertial elements at reduced cost while maintaining the high performance capabilities thereof.

One electrolyte found to be suitable was barium iodide in which silver iodide was dissolved. Barium iodide, soluble in water, formed a solution having a specific gravity of 2.28 at room temperature. A saturated solution of $BaI_2$ dissolved AgI sufficiently to increase the specific gravity to 2.75. This solution then dissolved still more $BaI_2$. The latter property, the ability of $BaI_2$ to complex AgI, was the basis for the composition of an electroplating solution having a specific gravity of 2.65 as to float element 20 with neutral buoyancy.

It is to be noted that several factors are involved in formulating dense solutions of $BaI_2$-AgI-$H_2O$. The solution must have sufficient acidity to prevent precipitation of the compound $BaI_2 \cdot BaO \cdot 9H_2O$; however, too great an acidity results in corrosion of the electrode material. Any iodide solution must be protected from contamination because a mild oxidizing agent will cause the formation of iodine, which colors the solution and competes with the cathodic electrode reactions. The AgI concentration must be sufficiently high to maintain solubility of $BaI_2$, but a slight excess of $BaI_2$ is desirable to prevent precipitation of AgI on the anode.

A satisfactory plating solution was formulated as follows:

*Solution A.*—110.0 grams of reagent grade $$Ba(OH)_2 \cdot 8H_2O$$

were dissolved in 100 milliliters of purified 48% HI (stabilized grade). The resulting $BaI_2$ solution was evaporated until a specific gravity of 2.13 was obtained (boiling point 116° C.). Because of variations in concentration of commercial 48% HI, it may sometimes be necessary to add more acid drop-wise to dissolve all the $$Ba(OH)_2 \cdot 8H_2O$$

or to add more of the latter if two much acid is present. In any case, the final solution should have a pH of about 2.0. The solution should be water-white; any iodine which forms may be removed by refluxing the solution with silver metal.

*Solution B.*—24.0 grams of AgI were dissolved in 25.0 milliliters of solution to form a solution having a specific gravity of 2.70.

*Plating Solution.*—Solutions A and B were then mixed in the volume ratio of 2:8. The resulting mixture had a specific gravity of close to 2.65. The specific gravity may be increased by evaporation or by adding $BaI_2$, if available. The density may be decreased by adding $H_2O$. In any case, the specific gravity of the electrolyte may be made to match that of element 20. The addition of $H_2O$ causes a yellow precipitate which immediately dissolves on stirring. Extensive dilution, for example, to twice the volume, causes the formation of a permanent yellow precipitate, probably AgI; therefore, vessels should be cleaned of the plating solution by rinsing first with acetone several times and then with $H_2O$.

The plating solution above formulated was colorless and served to maintain the element 20 at a neutrally buoyant condition. The solution was found to have satisfactory plating characteristics. It was found that smooth deposits were enhanced by adding citric acid to the electrolyte in proportions of 0.1 gram per 10 milliliters of electrolyte. The electrolyte can be so formed as to have a specific gravity as high as 2.75. It may then be diluted with a solution such as ethanol for bipolar plating action at a specific gravity precisely corresponding with the specific gravity of the reference element 20.

A second electrolyte found to be suitable employed indium iodide. Indium iodide was used to increase the density of a solution containing silver iodide complexed with lithium iodide. Silver iodide is not soluble in indium iodide alone.

A satisfactory plating solution having specific gravity of 2.65 was made as follows:

(1) 70 grams of indium metal was dissolved in 300 milliliters 48% HI. The reaction is slow at room temperature but may be accelerated by refluxing the mixture. The reaction rate is also increased by using spongy indium formed by pouring the molten metal into cold water.

(2) The resulting solution (specific gravity=1.8) was evaporated until a density of 2.7 was obtained (boiling point 112° C.).

(3) Lithium iodide was then added to the solution to a concentration of 2.5 moles per liter (335 grams per liter). Commercial anhydrous LiI contains up to 30% $H_2O$ so it was necessary to dry the LiI by heating in a vacuum before use. The dry salt is very hydroscopic and must be protected from the atmosphere.

(4) Finally, silver iodide was dissolved in the $$InI_3\text{-}LiI\text{-}HI\text{-}H_2O$$

system to a concentration of 0.25 mole per liter (59.0 grams per liter). The resulting solution was bright yellow and was adjusted to a specific gravity of 2.65 by diluting with $H_2O$ acidified to a pH of 2.5. Adjustment may also be made by adding crystalline $InI_3$.

Precautions must be observed in making the $InI_3$ dense solution. The LiOH content of commercial LiI varies widely and may neutralize the HI excessively. This condition is evidenced by difficulty in dissolving the LiI in step 3. If, for some reason, the ratio of LiI to AgI is too low, a second liquid phase will separate from the $InI_3$ solution. This condition is remedied by adding more LiI to the solution.

The acidity of the solution must be maintained below a pH of 2.0 at all times to prevent the precipitation of $In(OH)_x(I)_y$. This reaction is not readily reversible; if it occurs, the solution must be refluxed with excess HI to redissolve the precipitate. Excess HI must then be removed by reaction with metallic indium.

The transducers 31 and 32 were energized by way of contact springs, such as spring 82, from a system composed of a radio frequency voltage generator and a low output impedance radio frequency power amplifier. In an embodiment of the type illustrated in FIGURE 3, the output power was delivered from three parallel 807 power tubes operating Class B and having a tuned output transformer. The excitation system was regulated for a constant excitation level. The output impedance of the excitation system, as seen by the transducers 31 and 32, was 0.5 ohm. The frequency was in the range of from 600 to 900 kilocycles per second.

The system for the excitation of lamp 95 included a 5-megacycle oscillator and a power amplifier capable of developing a lamp operating voltage of 450 volts.

The heater windings 190 were energized from a controller of the type manufactured and sold by A C Spark Plug, and designated as a Type X856,207 Magnetic Amplifier. The amplifier was connected at its input to the windings 191 to sense the temperature chamber 30 and to control the power applied to heater windings 190

The gimbal control servo amplifier system for slaving the chamber 30 to the element 20 is illustrated in one form in FIGURE 7. The photocells 100 and 101 of FIGURE 3 were included in a Wheatstone bridge 300 of FIGURE 7. The dual beam light path transmitted through the fiber optic light pipes 96 and 97, Polaroid disks 107 and 121, and the optical wave plate 23, FIGURE 3, serve to control the balance of the bridge 300. With the Polaroid disks having transmission axes as shown by the arrows 107e, 107d, 121a and 121e, the optical gain of the pick-off system itself is high. This permitted the production of an error voltage from the bridge 300 of considerable magnitude for a given rotational displacement between the disk 23 and the chamber 30. The bridge 300 is energized by way of transformer 301 from a 115-volt, 400 cycle per second source 302. The transformer 303 couples the bridge 300 to a preamplifier 304 with matched impedance. The preamplifier 304 includes a cathode follower input stage 305 with a parallel T-filter 306 which serves to reduce third harmonic noise generated in the bridge transformer 303 at the null point. A single high gain amplifier stage 307 follows the filter. A gain control potentiometer 308 is provided for the adjustment of the gain in the servo loop. A mixer-amplifier 310 is provided to sum three signals, i.e., the forward loop signal, feedback loop signal and quadrature cancellation signal. The mixer 310 is tuned to the carrier frequency as to suppress harmonic noise. A signal is produced in a quarature injection circuit 311 which is derived from the source 302 which is employed to excite the pick-off bridge 300. The circuit 311 provides a quadrature voltage on the output line 312 which is introduced into the mixer 310 in quadrature to null the quadrature components originating in the bridge 300 and thereby prevent heating of the torquer 134.

The output of the mixer 310 is fed by way of a filter 314 to a power amplifier 315 which, in turn, was employed to energize the winding 137 of the torquer 134. A second winding on the torquer 134, the winding 137a, is energized from the 115-volt, 400 cycle source by way of transformer 316.

The torquer 134 is coupled to the chamber 30 as indicated by the dotted linkage 317. The output of the amplifier 315 is also fed to the input 320 of a feedback stabilizing network. The voltage at the input 320 is demodulated through a ring demodulator 321. It is operated on by a lag network 322 and modulated through a ring modulator 323. The output of the ring modulator 323 is amplified in amplifier 324 and is transmitted by way of channel 325 to the mixer 310.

In this embodiment the servo amplifier loop had a gain of 1,000 volts per degree, and had a natural undamped frequency of 40 cycles per second.

In FIGURE 8 there is illustrated a system for detecting and making a recording of the rotation of the case 10 on axis 14 relative to the chamber 30. In this system, no attempt is made to control the body on which the system is mounted. Rather, rotational deviations between the body 20 and the case 30 are employed. The system is a null balance position servo.

The inertial platform comprising the chamber 30 and the inertial element 20 is represented in FIGURE 8 by the dotted rectangle 330. The synchro control transmitter 161–164 is coupled by a three-phase line 331 to a synchro control differential 332. The differential 332 is coupled by way of a three-phase line 333 to a control transformer 334. The rotation of the case 10 relative to the chamber 30 will cause voltages to be produced at the output of the synchro control transmitter 161–164. The voltage on each of the three-phases varies sinusoidally as rotation is experienced. The control differential 332 is included in the linkage between the transmitter 161–164 and the control transformer 324 to permit manual adjustment or positioning of the readout level. The three-phase voltage applied to the control transformer 324 is converted, in the secondary winding thereof, to a single phase voltage. The latter voltage is applied by way of a channel 335 which is the input of a servo amplifier in a servo loop employed to convert the sinusoidal function into a linear function.

The servo amplifier 336 serves to drive a motor 337 which is linked as indicated by the dotted line 338 to a generator 339. Generator 339 applies a stabilizing voltage to the servo amplifier 336 by way of network 340. The network 340 serves to provide a stabilizing voltage in a well-known manner for the amplifier 336. The motor 337 also drives a pair of gear reduction elements 341 and 342. The output shaft from the element 342 is coupled as by way of a linkage 343 to the control transformer.

In operation, the signal at the input of amplifier 336 is at a null so long as the control transformer 334 is in a predetermined positional relationship with respect to the synchro control transmitter 161–164. However, when the case 10 rotates relative to the chamber 30, this positional relationship is disturbed. As a result, an input signal is applied to the servo amplifier. The servo loop serves to drive the control transformer to restore its positional relationship between it and the synchro control transmitter 161–164. Thus, a null signal is maintained at the input of the servo amplifier 336. The gear elements 341 and 342 are mechanically linked to potentiometers 350 and 351, respectively. The output voltage from the potentiometers is then applied to a recorder 352. Potentiometers 350 and 351 are supplied by a direct current voltage from a supply 353. The potentiometers may be rotated without limitation. Thus, repetitive cycles of a saw-tooth voltage are applied to the recorder 352 and provide a direct and linear measurement of the rotation of the case 10 relative to the chamber 30.

A system of the foregoing type has been employed for measurement of relatively low rotational rates as, for example, earth rotation with reference to the chamber 30. Where the system is to be employed for aircraft or missile guidance, a readout system of the digital type such as shown in FIGURE 1 or other readout means having a high resolution may be employed in place of the synchro control transmitter, which has been included in FIGURES 3 and 8.

In the system above described, the reference element 20 is permitted to be freely rotatable. The chamber 30, mounted on gimbals, is slaved to the reference element 20. This avoids the introduction of difficulties by reason of the fluid coupling between the chamber 30 and the element 20.

In accordance with one aspect of the invention, the chamber 30 is clamped or fixed directly to the moving vehicle or frame and the reference element 20 is acoustically restrained at a reference position as in FIGURE 3. However, the output system includes means for generating a function representative of the transfer function of the fluid coupling between the inertial element 20 and the chamber 30. Such a system is illustrated in FIGURES 9–11.

In FIGURE 9, the chamber 30 is illustrated as being secured directly to the outer case 10. In this embodiment, light from the source 95 is piped through the chamber 30 and the Polaroid disks to provide an output signal from the cells 100 and 101. When the chamber 30 rotates about axis 14, the element 20, by reason of the fluid coupling, also tends to rotate to follow the chamber 30. If the chamber 30 rotates through an angle $\theta(r_{30})$ then, because of the fluid coupling, the element 20 will be pulled with chamber 30 through an angle $\theta(r_{20})$. The signal from the photocells 100 and 101 is representative of the difference between the two angles $\theta(r_{30})$ and $\theta(r_{20})$. For the purpose of measuring the motion of the chamber 30, it is necessary to know the angle $\theta(r_{30})$. In the present embodiment, and in contrast with the system of FIGURE 3, the chamber 30 is strapped to the case 10 and the readout system is provided with a computation means having built into it the transfer function of the fluid coupling so that the signal from the cells 100 and 101 will be treated to produce an output which is representative of the angle $\theta(r_{30})$.

A block diagram for the system is shown in FIGURE 11. The element 375 functionally represents the subtraction of angle $\theta(r_{30})$ from angle $\theta(r_{20})$. Thus, the signal from the pick-off unit 376 is representative of the difference between the angles. The signal from the pick-off unit 376 is applied to a computer unit 377 which computes the angle $\theta(r_{20})$ that the element 20 rotates in response to the rotation of the housing 30 through angle $\theta(r_{30})$. The latter angle, together with the difference angle appearing at the output of the pick-off 376, is then applied to a summing unit 378 so that the output of the summing unit is the angle $\theta(r_{30})$.

The functions $F(s)$ which represents the transfer function of the fluid coupling in Laplace transform notation, may be identified as follows:

$$F(s) = \frac{C\sqrt{Ns}}{I_{20}s\left[-1\frac{C}{I_{20}s}\left(1-\frac{1}{r_{20}}\right)\right]}[AI_0(r_{20}\sqrt{Ns})+BK_0(r_{20}\sqrt{Ns})] \tag{5}$$

where:

A, B and C are constants involving $r_{20}$ and $r_{30}$;
$s$ is a complex variable for the Laplace transform;
$N = \rho/\mu$;
$\rho$ is density of the fluid;
$\mu$ is the viscosity of the fluid;
$r_{20}$ is the radius of element 20;
$r_{30}$ is the radius of chamber 30;
$I_{20}$ is the moment of inertia of element 20;
$I_0$ is a modified Bessel function of the zero order, and
$K_0$ is a modified Bessel function of the second kind of the zero order.

With the computer 377 responsive to the output signal from the pick-off unit for computing the actual rotation of the element 20, then the rotation of the chamber 30 may be fully measured. Thus, this system differs from the system of FIGURE 3 in that the servo system and gimbal arrangement for driving the chamber 30 are eliminated. In place thereof, the transfer function of the fluid coupling is employed.

In the embodiment illustrated in FIGURE 3, the gimbal mounted housing 30 is forced to follow element 20. The rotation of the housing 30 is then available a the output of the readout system 180. The terminals at the output of unit 180 may be connected to a recording system or other utilization means. Additionally, the output may be connected to the commutating control 195, the output of which is connected through slip-ring unit 150 to the microbalance electrodes 200–207. Commutation, by unit 195, may thus be controlled so that the electroplating current will flow between substantially vertically spaced electrodes. The logic of the commutation employed will depend upon the method of balancing selected, whether it be the equilibrium or nonequilibrium method.

The flotation fluid is a heavy fluid having a specific gravity which is substantially equal to the specific gravity of the inertial element 20. An exact match between the fluid and element 20 is preferred so that element 20 is neutrally buoyant. Since the pressure standing wave pattern is symmetrical about the chamber axis, the element will be positionally restrained even though slightly buoyant. The electrolyte employed for the microbalancing method may be formulated to match the specific gravity of element 20. It is a substantially clear liquid, permitting the passage of light therethrough for sensing purposes. When it is desired to operate with a flotation fluid other than electrolyte, the flotation fluid may be a mixture of tetrabromo-ethane and m-bromo-toluene of such proportions that the specific gravity substantially matches the specific gravity of the reference element 20.

Having described the invention in connection with certain specific embodiments thereof, it is to be understood that further modifications may now suggest themselves to those skilled in the art and it is intended to cover such modifications as fall within the scope of the appended claims.

What is claimed is:

1. An inertial reference unit for sensing rotational deviation which comprises:
   (a) a chamber unit full of fluid,
   (b) a pair of hemispherical acoustic transducers supported by said unit symmetrical to an axis extending therethrough in a spaced apart relation with the exterior surfaces thereof facing each other, and
   (c) an inertial element positioned in said unit having a pair of oppositely opening concave surfaces symmetrical to a line parallel to said axis whereby said inertial element may be resiliently supported in said fluid upon excitation of said transducers to develop standing pressure waves by reaction with said surfaces on said element.

2. An inertial reference unit for sensing rotational deviation which comprises:
   (a) a chamber unit full of compressible fluid,
   (b) a pair of hemispherical acoustic transducers supported by said unit symmetrical to a selected axis therethrough in a spaced apart relation with the exterior surfaces thereof facing each other, and
   (c) an inertial element having symmetry to an element axis positioned in said unit and having a pair of oppositely opening hemispherically concave surfaces lying along said element axis and at least partially enveloping said transducers whereby said inertial element may be resiliently supported in said fluid upon excitation of said transducers to develop standing pressure waves by reaction with said surfaces.

3. An inertial reference unit for sensing rotational deviation which comprises:
   (a) a chamber unit full of a compressible fluid,
   (b) a pair of hemispherical acoustic transducers supported by said unit symmetrical to an axis extending therethrough in a spaced apart relation with the exterior convex surfaces thereof facing each other, and
   (c) a solid inertial element of specific gravity substantially equal to the specific gravity of said fluid positioned in said unit and having a pair of oppositely opening concave surfaces at least partially enveloping said transducers whereby said inertial element may be resiliently supported in said fluid upon excitation of said transducers to develop standing pressure waves by reaction with said surfaces.

4. An inertial unit having a motion sensing system which comprises:
   (a) a chamber unit full of a compressible acoustic transmission fluid,
   (b) a cylindrical element immersed in said fluid having hollow end portions,
   (c) acoustic transmitters mounted on opposite ends of said chamber unit facing said hollow end portions for establishment upon excitation of the transmitters of pressure waves in said fluid to produce standing pressure wave patterns in which said element seeks an equilibrium position while remaining unrestrained as to rotation, and
   (d) means for sensing relative rotation between said chamber unit and said element.

5. An inertial unit having a motion sensing system which comprises:
   (a) a chamber unit full of a compressible acoustic transmission fluid,
   (b) a cylindrical element immersed in said fluid having hemispherically concave end portions,
   (c) acoustic transmitters mounted on opposite ends of said chamber unit facing said hollow end portions for establishment, upon excitation of the said transmitters, of pressure waves in said fluid to establish standing pressure wave patterns in which said element seeks an equilibrium position and in which it is freely rotatable, and
   (d) means for sensing relative rotation between said chamber unit and said element.

6. In a motion sensing system having a solid inertial element, the combination which comprises:
   (a) a cylindrical housing having means therein for generating sound energy traveling radially along paths common to the axis of said housing and an axis of symmetry of said inertial element,
   (b) a fluid in said housing of density of the order of the density of said element for flotation of said element, and
   (c) a sound absorbing liner for the cylindrical wall portions of said housing for minimizing reflection of said sound energy whereby standing pressure waves of second order radiation stabilize said element at a reference position in said housing.

7. The combination set forth in claim 6 in which the source of sound energy comprises a piezoelectric hemisphere in each end of said housing for production of radially divergent sound fields having symmetry with respect to supported surfaces on said inertial element.

8. An inertial reference system for sensing rotational deviation which comprises:
   (a) a chamber unit full of fluid,
   (b) a pair of hemispherical acoustic transducers supported in said unit in a spaced apart relation with the interior convex surfaces thereof facing each other,
   (c) an inertial element positioned in said unit having a pair of oppositely opening concave surfaces symmetrical to a line parallel to the axis of said unit, said element including an optically active section positionally variable upon rotation of said element in said unit,
   (d) gimbal means for supporting said unit for rotation about said axis, (e) light source means mounted on said unit including means for directing beams of light through said unit and through said optically active section along lines parallel to said axis,
(f) detectors for said beams mounted on said unit at the end thereof opposite said source means,
(g) a light polarizing carriage means including polarizing plates at each end of said unit located between said source means and said unit and between said unit and said detectors, respectively,
(h) means for selectively locking said polarizing carriage means to said unit,
(i) means for energizing said transducers for production of ultrasonic energy in said fluid to produce element positioning standing pressure waves upon reaction of said energy with said concave surfaces, and
(j) utilization means connected to said detectors for measuring the rotation of said unit with reference to said element.

9. An inertial reference system for sensing rotational deviation which comprises:
(a) a chamber unit full of fluid,
(b) a pair of hemispherical acoustic transducers supported in said unit symmetrical to an axis extending therethrough in a spaced apart relation with the interior convex surfaces thereof facing each other,
(c) an inertial element positioned in said unit having a pair of oppositely opening concave surfaces symmetrical to a line parallel to said axis, said element including an optically active section positionally variable upon rotation of said element in said unit,
(d) gimbal means for supporting said unit for rotation about the axis of symmetry of said transducers,
(e) light source means mounted on said unit including means for directing two beams of light through said unit and through said optically active section along lines parallel to said axis at diametrically opposed zones,
(f) a pair of detectors for said light beams mounted on said unit at the end thereof opposite said source means,
(g) a light polarizing carriage means including polarizing plates at each end of said unit located between said source means and said unit and between said unit and said detectors, respectively,
(h) means for selectively locking said polarizing carriage means to said unit,
(i) means for energizing said transducers for production of ultrasonic energy in said fluid to produce element positioning standing pressure waves upon reaction of said energy with said concave surfaces, and
(j) utilization means connected to said detectors for measuring the rotation of said unit with reference to said element.

10. Start-up means for a motion sensing system which comprises:
(a) a housing having a compressible acoustic transmission fluid therein,
(b) an inertial element immersed in said fluid and including an optically active wave plate,
(c) means for generating ultrasonic fields in said fluid characterized by standing pressure wave patterns normally to support said element at equilibrium,
(d) means for mounting said housing for rotation about an axis corresponding with the axis of said element,
(e) a polarizing carriage including a first polarizing plate at one end of said housing and a second polarizing plate at the other end of said housing with said first polarizing plate oriented 90° with respect to said second polarizing plate,
(f) means for supporting said carriage for free rotation about said axis,
(g) light source means and detector means supported on said housing for directing light beams through the plates and for detecting said beams emerging from said plates, respectively, and
(h) means for selectively locking said carriage to said housing.

11. A high gain rotational detector means for sensing direction and magnitude of rotation of an element relative to a selected axis on a reference platform which comprises:
(a) an optically active wave plate mounted on said element transverse to said axis for rotation with said element about said axis,
(b) means for directing two beams of light along light paths which pass through said plate at angularly spaced locations,
(c) a detector in each of said light paths for intercepting light after passage through said wave plate,
(d) a pair of polarizing means on one side of said wave plate with the optical axes thereof at the locations of said paths separated by a relatively small angle $\beta$,
(e) a pair of polarizing means on the other side of said wave plate having their optical axes separated by an angle of $90°+\beta$, and
(f) circuit means for generating an output representative of the light impinging said detectors.

12. The combination set forth in claim 11 in which said wave plate is a $\pi$-wave plate.

13. A multi-coordinate system for sensing motion of a frame which comprises:
(a) at least two housings mounted for rotation in said frame on axes which are mutualy perpendicular,
(b) inertial elements in each of said housings acoustically constrained for movement relative to said housings except for rotation about their respective housing axes,
(c) means for sensing relative rotation about the respective axes between each said inertial element and its housing,
(d) drive means responsive to the sensing means for forcing each housing to follow its inertial element,
(e) means for generating a condition representative of the rotation of the first said housing about the first axis, and
(f) means for generating a condition representative of the rotation of the second said housing about the second axis.

14. A system for sensing the motion of a moving body which comprises:
(a) a base secured to said body,
(b) three flotation chamber units each filled with a compressible fluid and mounted on said body with their axes mutually perpendicular, each flotation unit including an inertial element acoustically restrained therein at a reference position while free to rotate about the axis of its chamber unit, and
(c) means for sensing the component of rotation of said base related to each of said three axes relative to the reference element rotatable on said axis to produce three output signals each representative of each one component of said rotation.

15. An inertial reference motion sensing system which comprises:
(a) a chamber unit full of a compressible fluid,
(b) a reference element immersed in said fluid,
(c) generating means in said chamber unit for generating ultrasonic field energy in said fluid and for radially directing said energy onto opposed surfaces of said element to restrain said element at a predetermined position in said chamber unit,
(d) means for generating a first signal representative of the difference between the rotation of said chamber unit about its axis and the rotation of said element as it tracks said chamber unit under the force of fluid coupling thereof to said chamber unit,
(e) means responsive to said first signal for generating a second signal representative of the rotation of said element in response to said force, and
(f) means responsive to said first signal and said second signal to generate an output function representative of the angular rotation of said chamber unit.

16. An inertial reference motion sensing system which comprises:
(a) a chamber unit full of a compressible fluid,
(b) a reference element immersed in said fluid,
(c) generating means in said chamber unit for generating ultrasonic field energy in said fluid and for radially directing said energy onto opposed surfaces of said element to restrain said element at a predetermined position in said chamber unit,
(d) means for generating a first signal representative of the difference between the rotation of said chamber unit about its axis and the rotation of said element as it tracks said chamber unit under the force of fluid coupling thereof to said chamber unit,
(e) means responsive to said first signal for generating a second signal representative of the rotation of said element in response to said force, and
(f) means for adding said first signal and said second signal to generate an output function representative of the angular rotation of said chamber unit.

17. The combination which comprises:
(a) a closed cylinder full of a compressible fluid,
(b) a cylindrical reference element having ends with concave surfaces immersed in said fluid,
(c) convex sound transducer means mounted in the ends of said cylinder and adapted, upon excitation, for the production of fields which are radially divergent and which react with said concave surfaces to restrain said element at a reference position in said cylinder in a freely rotatable state with respect to the axis of said transducers,
(d) means for generating a first signal representative of the difference between the rotation of said cylinder about its longitudinal axis and the rotation of said element due to the force of the fluid coupling,
(e) a computer means connected to said detector means for generating a function $$F(s)/1-F(s)$$

wherein:

$$F(s) = \frac{C\sqrt{Ns}}{I_e s \left[1 - \frac{C}{I_e s}\left(1 - \frac{1}{r_c}\right)\right]} [AI_0(r_e\sqrt{Ns}) + BK_0(r_e\sqrt{Ns})]$$

A, B and C are constants involving $r_e$ and $r_c$,
s is a complex variable for the Laplace transform,
$N = \rho/\mu$, $\rho$ is density of said fluid,
$\mu$ is the viscosity of said fluid,
$r_e$ is the radius of said element,
$r_c$ is the radius of said cylinder,
$I_{20}$ is the moment of inertia of said element,
$I_0$ is a modified Bessel function of the zero order,
$K_0$ is a modified Bessel function of the second kind of the zero order, and (f) means responsive to said first signal and said function to generate an output function representative of the angular rotation of said cylinder.

18. An inertial reference motion sensing system which comprises:
(a) a cylindrical housing full of a compressible acoustic transmission fluid,
(b) a solid cylindrical reference element having concave ends immersed in said fluid,
(c) generating means at opposite ends of said housing for generating ultrasonic field energy in said fluid which is directed into said concave ends of said element to restrain said element at a predetermined position in said housing,
(d) means for generating a first signal representative of the difference between the rotation of said housing about its axis and the rotation of said element as it tracks said housing under the force of fluid coupling thereof to said housing,
(e) means responsive to said first signal for generating a second signal representative of the rotation of said element in response to said force, and
(f) means for adding said first signal and said second signal to generate an output function representative of the angular rotation of said housing.

References Cited by the Examiner

UNITED STATES PATENTS

| | | | |
|---|---|---|---|
| 1,519,572 | 12/1924 | Wolf | 204—15 |
| 2,370,000 | 2/1945 | Best | 33—204.3 |
| 2,603,767 | 7/1952 | Ferrill | 73—505 X |
| 2,904,700 | 9/1959 | Rockey | 250—225 |
| 2,942,479 | 6/1960 | Hollmann | 73—505 X |
| 2,983,655 | 5/1961 | Sullivan | 204—15 |
| 2,996,625 | 8/1961 | Neergaard | 250—225 |
| 3,088,324 | 5/1963 | Strang | 73—505 |
| 3,161,064 | 12/1964 | Johnston | 73—490 |
| 3,164,022 | 1/1965 | Ensley | 73—505 |

RICHARD C. QUEISSER, *Primary Examiner.*

JAMES J. GILL, *Examiner.*